(12) United States Patent
Beil et al.

(10) Patent No.: US 8,793,997 B2
(45) Date of Patent: Aug. 5, 2014

(54) INTERNAL COMBUSTION ENGINE

(75) Inventors: Heiko Beil, Stuttgart (DE); Florian Wegenast, Ostfildern (DE)

(73) Assignee: Daimler, AG, Stuttgart (DE)

( * ) Notice: Subject to any disclaimer, the term of this patent is extended or adjusted under 35 U.S.C. 154(b) by 183 days.

(21) Appl. No.: 13/367,563

(22) Filed: Feb. 7, 2012

(65) Prior Publication Data

US 2012/0180479 A1 Jul. 19, 2012

Related U.S. Application Data

(63) Continuation-in-part of application No. PCT/EP2010/004044, filed on Jul. 3, 2010.

(30) Foreign Application Priority Data

Aug. 8, 2009 (DE) .......................... 10 2009 036 743

(51) Int. Cl.
| | |
|---|---|
| *F02B 33/44* | (2006.01) |
| *F02B 29/04* | (2006.01) |
| *F02M 25/07* | (2006.01) |
| *F01N 3/00* | (2006.01) |
| *F01N 3/10* | (2006.01) |
| *F02B 37/18* | (2006.01) |
| *F02B 37/00* | (2006.01) |
| *F02B 37/12* | (2006.01) |
| *F02B 37/013* | (2006.01) |
| *F01N 3/021* | (2006.01) |
| *F01N 13/02* | (2010.01) |

(52) U.S. Cl.
CPC .............. *F02B 37/18* (2013.01); *F01N 3/021* (2013.01); *F02M 25/0732* (2013.01); *F02B 29/0406* (2013.01); *F02M 25/0728* (2013.01); *F01N 3/106* (2013.01); *F02B 37/004* (2013.01); *F02B 37/127* (2013.01); *Y02T 10/121* (2013.01); *Y02T 10/144* (2013.01); *F02M 25/0711* (2013.01); *F02M 25/0718* (2013.01); *F02B 37/013* (2013.01); *F01N 13/02* (2013.01); *F01N 2240/36* (2013.01); *F02M 25/0744* (2013.01); *F01N 3/103* (2013.01)
USPC ................ 60/605.2; 60/612; 60/599; 60/282; 60/299; 123/562; 123/563; 123/568.11; 123/568.12; 701/108

(58) Field of Classification Search
CPC ........ F02B 37/013; F02B 37/18; F02B 37/16; F02B 37/127; F02B 29/0406; F02B 37/004; F02D 41/005; F02M 25/071; F02M 25/0707; F02M 25/0709; F02M 25/0726; F02M 25/0728; F02M 25/0718; F02M 25/0732; F02M 25/0744; F01N 3/106; F01N 3/00; F01N 13/00
USPC ................ 60/605.2, 612, 599, 611, 274–324; 123/562, 563, 568.11, 568.12; 701/108
See application file for complete search history.

(56) References Cited

U.S. PATENT DOCUMENTS

| | | | |
|---|---|---|---|
| 7,013,879 B2 | 3/2006 | Brookshire et al. | |
| 7,246,485 B2 * | 7/2007 | Ohki et al. ...................... | 60/295 |
| 7,370,474 B2 * | 5/2008 | Minami .......................... | 60/295 |
| 7,377,270 B2 * | 5/2008 | Duffy et al. ............... | 123/568.12 |
| 7,380,540 B1 * | 6/2008 | Duffy et al. ................... | 701/103 |
| 7,469,181 B2 * | 12/2008 | Duffy et al. ................. | 60/605.2 |
| 7,512,479 B1 * | 3/2009 | Wang ....................... | 123/568.21 |
| 7,801,669 B2 * | 9/2010 | Nagae ....................... | 123/568.21 |
| 2005/0103013 A1 | 5/2005 | Brookshire | |
| 2006/0236693 A1 | 10/2006 | Wei et al. | |
| 2007/0214771 A1 | 9/2007 | Freitag et al. | |
| 2008/0141671 A1 | 6/2008 | Takemoto | |
| 2013/0269327 A1 * | 10/2013 | Keppeler ........................ | 60/301 |
| 2013/0298525 A1 * | 11/2013 | Lim et al. ........................ | 60/273 |

FOREIGN PATENT DOCUMENTS

| | | |
|---|---|---|
| CN | 2006 80047710.3 | 12/2008 |
| CN | 100034 2013 | 6/2013 |
| DE | 10 2005 046 507 | 4/2007 |
| JP | 2004 150319 | 5/2004 |
| WO | WO 2004/04412 | 5/2004 |

| WO | WO 2007/107865 | 9/2007 |
| WO | WO 2008/007808 | 1/2008 |
| WO | WO 2008/058596 | 5/2008 |

* cited by examiner

*Primary Examiner* — Thai Ba Trieu
*Assistant Examiner* — Ngoc T Nguyen
(74) *Attorney, Agent, or Firm* — Klaus J. Bach

(57) ABSTRACT

In an internal combustion engine and a method of operation the internal combustion engine which includes a high pressure and a low pressure turbocharger having exhaust gas turbines arranged in series in an engine exhaust line provided with a high pressure exhaust gas recirculation line and a low pressure exhaust gas recirculation line via which exhaust gas can be conducted to an inlet line of the engine, the arrangement is switchable depending on the engine speed between an exhaust gas recirculation by way of the high pressure line and an exhaust gas recirculation by way of both, the high pressure and the low pressure line, to achieve low emissions and low fuel consumption.

12 Claims, 5 Drawing Sheets

INTERNAL COMBUSTION ENGINE

This is a Continuation in Part application of international patent application PCT/EP2010/004044 filed Jul. 3, 2010 and claiming the priority of German patent application 10 2009 036 743.8 filed Aug. 8, 2009.

The invention relates to a method for operating an internal combustion engine having at least two turbochargers with turbines arranged in series in the engine exhaust duct and compressors arranged in series in the engine intake duct and with exhaust gas recirculation from the engine exhaust duct to the engine intake duct and also to an internal combustion engine designed to perform the method.

WO 2007/107865 A2 discloses an internal combustion engine with at least one exhaust gas turbocharger which comprises on an exhaust gas side of the internal combustion engine a turbine through which an exhaust gas of the internal combustion engine can flow, wherein subject to an operating state of the internal combustion engine by means of a high pressure exhaust gas recirculation and by means of a low pressure exhaust gas recirculation exhaust gas is removed and recirculated to a suction side of the internal combustion engine. In a speed range of the internal combustion engine a switching threshold is provided, at which there is a switch from a recirculation of the exhaust gas via the low pressure exhaust gas recirculation to a recirculation of the exhaust gas via the high pressure exhaust gas recirculation and via the low pressure exhaust gas recirculation. Below a speed threshold of 2000 rpm a high pressure exhaust gas recirculation is provided, whereas, above the speed threshold, a combined operation with low pressure exhaust gas recirculation and high pressure exhaust gas recirculation is established.

JP 2004 150319 A discloses a high pressure and low pressure exhaust gas recirculation and a single exhaust gas turbocharger. Below a switching threshold with a low or medium load and low to average speeds a combined high pressure and low pressure exhaust gas recirculation operation is provided. Below the switching threshold at low to average speeds and a high engine load on the other hand a low pressure exhaust gas recirculation operation is provided. Above the switching threshold a high pressure exhaust gas recirculation operation is provided at high engine speeds and high engine loads.

Furthermore an internal combustion engine is known from DE 10 2005 046 507 A1 which discloses an internal combustion engine with two exhaust gas turbochargers arranged one behind the other, wherein a recirculation of exhaust gas of the internal combustion engine from an exhaust gas system thereof is provided from upstream of a turbine of an exhaust gas turbocharger close to the engine into an intake passage of the internal combustion engine.

This known internal combustion engine already has good fuel consumption and emission values but increased resources are necessary to achieve future predefined emission limits.

U.S. Pat. No. 7,013,879 B2 discloses an exhaust gas recirculation system, wherein a high pressure exhaust gas recirculation is provided upstream of a turbine of an exhaust gas turbocharger and a low pressure exhaust gas recirculation is provided downstream of the turbine of the exhaust gas turbocharger.

WO 2008/058596 A1 describes an internal combustion engine with exhaust gas recirculation, wherein likewise a high pressure exhaust gas recirculation is provided upstream of a turbine of an exhaust gas turbocharger and a low pressure exhaust gas recirculation downstream of this turbine. These known solutions have problems, however, with regard to reaching future emission limits in particular.

It is the principal object of the present invention to improve a method for operating an internal combustion engine of the type described above so that low emissions can be realized with low fuel consumption.

SUMMARY OF THE INVENTION

In an internal combustion engine and a method of operation the internal combustion engine which includes a high pressure and a low pressure turbocharger having exhaust gas turbines arranged in series in an engine exhaust line provided with a high pressure exhaust gas recirculation line and a low pressure exhaust gas recirculation line via which exhaust gas can be conducted to an inlet line of the engine, the arrangement is switchable depending on the engine speed between an exhaust gas recirculation by way of the high pressure line and an exhaust gas recirculation by way of both, the high pressure and the low pressure line, to achieve low emissions and low fuel consumption.

A switching threshold is provided in a speed range of the internal combustion engine, at which there is a switch from a recirculation of the exhaust gas via the low pressure exhaust gas recirculation to a recirculation of the exhaust gas via the high pressure exhaust gas recirculation and via the low pressure exhaust gas recirculation.

The switching threshold is provided in a speed range of $1000 \leq \text{rpm} \leq 2000$ of the internal combustion engine, at which there is a switch from a recirculation of the exhaust gas via the low pressure exhaust gas recirculation to a recirculation of the exhaust gas via the high pressure exhaust gas recirculation and via the low pressure exhaust gas recirculation. In a speed range of the internal combustion engine below the switching threshold the exhaust gas is recirculated exclusively via the low pressure exhaust gas recirculation, and in a speed range of the internal combustion engine above the switching threshold the exhaust gas is recirculated in a combined manner via the high pressure exhaust gas recirculation and via the low pressure exhaust gas recirculation. In an upper speed range and/or load range of the internal combustion engine the exhaust gas recirculated exclusively via the high pressure exhaust gas recirculation.

This switching threshold lies in a speed range of greater than, or equal to 1000 revolutions per minute to less than or equal to 2000 revolutions per minute, in particular, a speed range of greater than or equal to 1200 revolutions per minute to less than or equal to 1600 revolutions per minute, and especially at substantially 1250 revolutions per minute. With this exhaust gas recirculation from the exhaust gas side of the internal combustion engine to the intake side via two exhaust gas recirculation paths it is possible to reach current emission limits but in particular also future emission limits provided by legislation. In particular compliance with EU6 emission limits without active nitrogen oxide exhaust gas aftertreatment ($NO_x$ exhaust gas aftertreatment) is thereby possible without a disadvantageous fuel consumption increase of the internal combustion engine.

The invention additionally relates to an internal combustion engine with at least one exhaust gas turbocharger which comprises on an exhaust gas side of the internal combustion engine a turbine through which an exhaust gas of the internal combustion engine can flow, wherein a high pressure exhaust gas recirculation and a low pressure exhaust gas recirculation are provided, by means of which exhaust gas can be recirculated from the exhaust gas side to a suction side of the internal combustion engine. A control device is assigned to the internal combustion engine, by means of which there is a switch in a speed range of the internal combustion engine from a recirculation of the exhaust gas by means of the low pressure exhaust gas recirculation to a recirculation of the exhaust gas via the high pressure exhaust gas recirculation and additionally via the low pressure exhaust gas recirculation. It is thereby provided according to the invention that the at least one exhaust gas turbocharger is a high pressure exhaust gas turbocharger, and that a low pressure exhaust gas turbocharger is connected in series downstream thereof, both respectively comprising at an exhaust gas side of the internal combustion engine a turbine through which an exhaust gas of the internal combustion engine can flow, wherein downstream of at least one of the two turbines of the two exhaust gas turbochargers the low pressure exhaust gas recirculation is arranged, and wherein the high pressure exhaust gas recirculation is arranged between the internal combustion engine and the turbine of the high pressure exhaust gas turbocharger, wherein the low pressure exhaust gas recirculation is arranged downstream of the turbine of the low pressure exhaust gas turbocharger.

By means of the control device, in a speed range $1000 \leq rpm \leq 2000$ of the internal combustion engine there is of the internal combustion engine there is a switch from a recirculation of the exhaust gas via the low pressure exhaust gas recirculation to a recirculation of the exhaust gas via the high pressure exhaust gas recirculation and also via the low pressure exhaust gas recirculation, wherein, below the speed range the exhaust gas is recirculated exclusively via the low pressure exhaust gas recirculation.

The control device may be for example a separate control unit. It is also possible for the control device to be integrated into an existing motor control unit which is provided on an engine and thus included in the internal combustion engine.

With the internal combustion engine and the method according to the invention compliance with said emission limits is achieved with only low expenditures, so that the costs for the internal combustion engine and for the method and thus for a motor vehicle are relatively low.

The internal combustion engine according to the invention is in particular a diesel engine, wherein avoidance of nitrogen oxide generation is very important. Nonetheless the internal combustion engine can also be another internal combustion engine, for example a gasoline engine.

With the inventive embodiment of the internal combustion engine and the method disclosed, an increase in the charging level is achieved by increasing an exhaust gas mass flow through the turbine of the corresponding exhaust gas turbocharger with a simultaneous increase in an exhaust gas recirculation. For the distribution of a mass flow of the exhaust gas recirculation the best possible compromise is to be sought between the fuel consumption and nitrogen oxide emissions of the internal combustion engine.

If at least one exhaust gas turbocharger of the internal combustion engine is a high pressure exhaust gas turbocharger, and a low pressure exhaust gas turbocharger is connected in series downstream of the high pressure exhaust gas turbocharger, wherein the exhaust gas turbochargers respectively comprise on an exhaust gas side of the internal combustion engine a turbine through which an exhaust gas of the internal combustion engine can flow, it is possible for the first exhaust gas recirculation to be arranged between the internal combustion engine and the turbine of the high pressure exhaust gas turbocharger. The at least one further exhaust gas recirculation device can then be arranged downstream of the turbine of the low pressure exhaust gas turbocharger and downstream of an exhaust gas aftertreatment system, in particular downstream of a particle filter, which in turn is arranged downstream of the turbine of the low pressure exhaust gas turbocharger. With this low pressure exhaust gas recirculation, higher charging pressures for the internal combustion engine are obtained due to a higher turbine power output because of higher mass flows of the exhaust gas. Due to these higher charging pressures in turn a higher air-fuel ratio can be achieved with the same oxygen mass concentration or, respectively, exhaust gas recirculation rate. This results in a better high pressure combustion process of the internal combustion engine.

Any disadvantages during a charge cycle of the internal combustion engine as a result of a higher exhaust gas counter pressure are more than compensated for by this better high pressure combustion process. Within the scope of the internal combustion engine according to the invention it is thus possible to achieve an improved fuel consumption of the internal combustion engine with constant oxygen mass concentration or a lower oxygen mass concentration with a constant air—fuel ratio and thus lower nitrogen oxide emissions with substantially constant fuel consumption.

In addition, a best possible compromise is achieved between soot and nitrogen oxide emissions with an expansion of the exhaust gas of the internal combustion engine ahead of the turbine of the high pressure exhaust gas turbocharger as a result of lower mass flows, whereby also a reduction in the charging cycle work of the internal combustion engine is obtained. As already indicated, by using a combined exhaust gas recirculation operation from the two exhaust gas recirculation devices a best possible compromise between emissions and fuel consumption is possible.

The invention will become more readily apparent from the following description of a preferred embodiment thereof with reference to the accompanying drawings.

DESCRIPTION OF EXEMPLARY EMBODIMENTS

Figure 1:
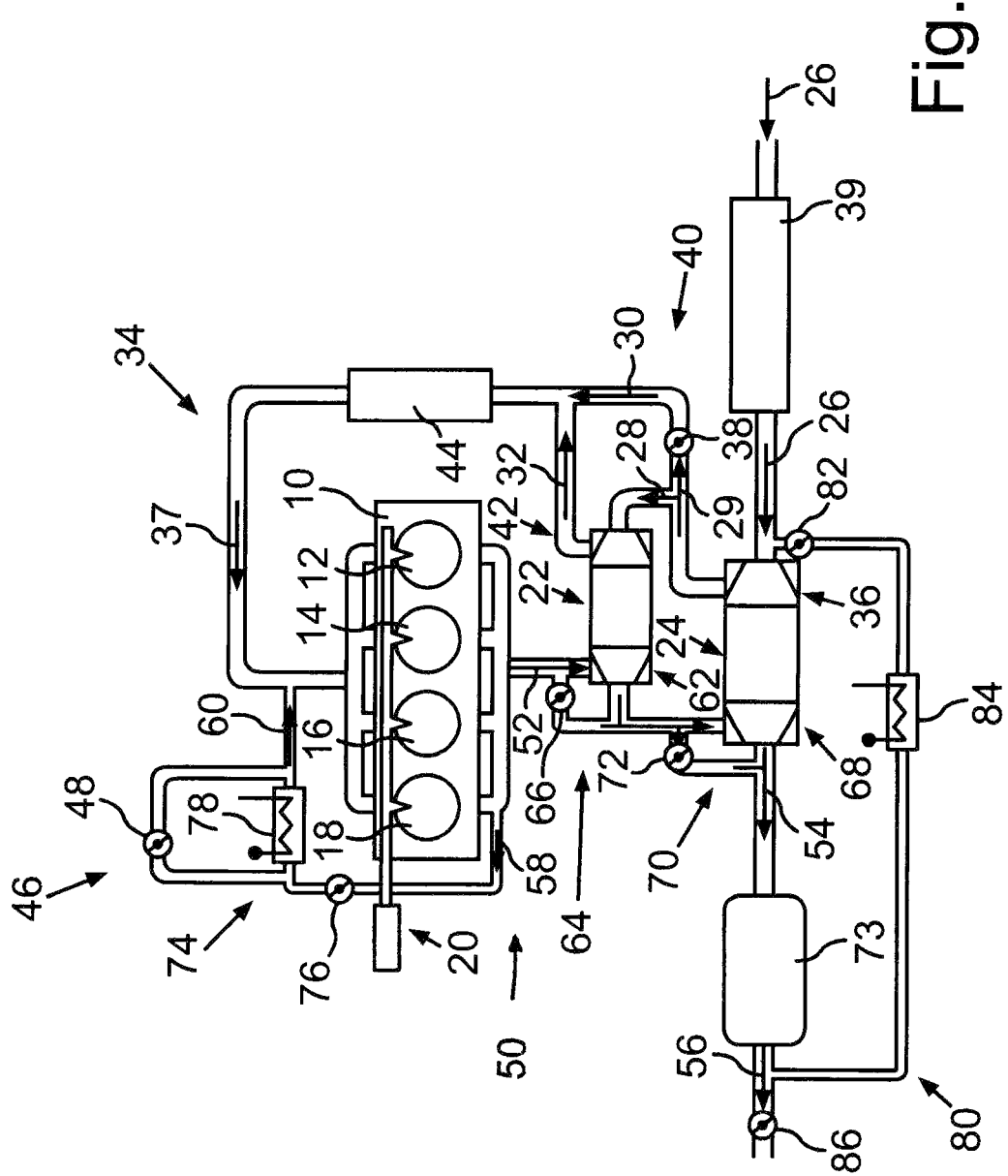
FIG. 1 shows a schematic representation of an internal combustion engine with a high pressure exhaust gas turbocharger and a low pressure exhaust gas turbocharger connected in series therewith, wherein on an exhaust gas side of the internal combustion engine upstream of a turbine of the high pressure exhaust gas turbocharger a first exhaust gas recirculation device is provided and downstream of a turbine of the low pressure exhaust gas turbocharger a second exhaust gas recirculation device is provided.

While FIG. 1 shows schematically an internal combustion engine with a two way exhaust gas recirculation, by which compliance with EU6 emission limits is easily possible, FIGS. 2 to 5 show operating strategies of the internal combustion engine or components of the internal combustion engine and the two way exhaust gas recirculation in order to achieve low emissions and also low fuel consumption.

FIG. 1 shows an internal combustion engine 10 which is in the form of a diesel engine and comprises four cylinders 12, 14, 16 and 18, into which fuel is injected by a high pressure injection system 20. The internal combustion engine 10 comprises a high pressure exhaust gas turbocharger 22 and a low pressure exhaust gas turbocharger 24 arranged downstream thereof in series. Air drawn in according to direction arrows 26 by the internal combustion engine on an intake side 34 thereof and filtered by an air filter 39 is pre-compressed by a compressor 36 of the low pressure exhaust gas turbocharger 24. Subject to a position of a circulation valve 38 of a bypass line 40 the pre-compressed air is further compressed by a compressor 42 of the high pressure exhaust gas turbocharger 22. Direction arrows 28, 29, 30, 32 and 37 indicate the intake air flow of the intake side 34 of the system.

Downstream of the compressor 42 of the high pressure exhaust gas turbocharger 22 the compressed and thus heated air flows through a charging air cooler 44, wherein the air is cooled.

On an exhaust gas side 50 of the internal combustion engine 10 an exhaust gas flows following a combustion of a fuel—air mixture according to direction arrows 52, 54, 56, 58 and 60 from the internal combustion engine 10 through the exhaust gas side 50. The exhaust gas thereby drives a turbine 62 of the high pressure exhaust gas turbocharger, wherein the turbine 62 is connected via a shaft to the compressor 42, and wherein the compressor 42 is driven by the exhaust gas. A charging pressure which is provided by the high pressure exhaust gas turbocharger 22 can be adjusted by a bypass line 64 which comprises a control valve 66, by means of which an exhaust gas mass flow which flows around the turbine 62 through the circulation device 64 can be adjusted.

In order to drive the compressor 36 of the low pressure exhaust gas turbocharger 24 a turbine 68 of the low pressure exhaust gas turbocharger 24 is arranged downstream of the turbine 62 on the exhaust gas side 50 which turbine is connected via a shaft to the compressor 36.

In order to bypass the turbine 68, a bypass line 70 is likewise provided which comprises a control valve 72 which is also described as a waste gate and can adjust—in a similar way to the control valve 66—an exhaust gas mass flow which turbine is to bypass the turbine 68.

According to the direction arrow 54 the exhaust gas flows further through an exhaust gas aftertreatment system in the form of an oxidation catalyst which purifies the exhaust gas of hydrocarbons (HC) and $CO_x$ emissions and also in the form of a particle filter 73, through which the exhaust gas is purified in particular of particles before it leaves—according to a direction arrow 56—the exhaust gas side 50 of the internal combustion engine 10 and is released to the environment.

In order to reduce emissions, in particular nitrogen oxide emissions ($NO_x$ emissions) the internal combustion engine 10 comprises a first exhaust gas recirculation device in the form of a high pressure exhaust gas recirculation arrangement 74 which removes the exhaust gas—according to a direction arrow 58—of the internal combustion engine directly downstream of the internal combustion engine and recirculates it—according to a direction arrow 60—to the intake side 34 directly upstream of the internal combustion engine 10. In order to adjust an exhaust gas mass flow of the recirculated exhaust gas a high pressure exhaust gas recirculation valve 76 is provided. Furthermore the high pressure exhaust gas recirculation arrangement 74 comprises an exhaust gas recirculation cooler 78 which reduces the temperature of the recirculated exhaust gas. The recirculated exhaust gas acts upon combustion of the internal combustion engine 10 as an inert gas and reduces the formation of nitrogen oxides.

The high pressure exhaust gas recirculation 74 comprises a circulation device 46 which is assigned to the exhaust gas recirculation cooler 78. Circulation is possible around the exhaust gas recirculation cooler 78 by way of the bypass line 46, whereby this circulation or mass flow of the circulating exhaust gas is controlled by a bypass valve 48 of the bypass line 46.

In order to comply with stricter emission limits, in particular nitrogen oxide limits, such as the EU6 standard, the internal combustion engine 10 additionally comprises a second exhaust gas recirculation device in the form of a low pressure exhaust gas recirculation line 80, by means of which exhaust gas of the internal combustion engine 10 can be removed directly after the particle filter 73 on the exhaust gas side 50 and recirculated to the intake side 34 directly before the compressor 36 of the low pressure exhaust gas turbocharger 24. In order to adjust an exhaust gas mass flow of this recirculated exhaust gas a further exhaust gas recirculation valve 82 is provided in the form of a low pressure exhaust gas recirculation valve 82. The low pressure exhaust gas recirculation line 80 also comprises an exhaust gas recirculation cooler 84 for cooling the recirculated exhaust gas.

The low pressure exhaust gas recirculation line 80 is further controllable by exhaust gas back-up valve 86, by means of which the exhaust gas of the internal combustion engine can be restricted directly downstream of a removal point of the low pressure exhaust gas recirculation line 80 and thus creates a further control possibility for the exhaust gas mass flow.

By an operating point-dependent mixing of the exhaust gas mass flow of the exhaust gas recirculated through the low pressure exhaust gas recirculation line 80 an exhaust gas turbocharger charging can be significantly increased in comparison with a high pressure exhaust gas recirculation. An exhaust gas recirculation through the low pressure exhaust gas recirculation line 80 is thus a charging means.

Figure 2:
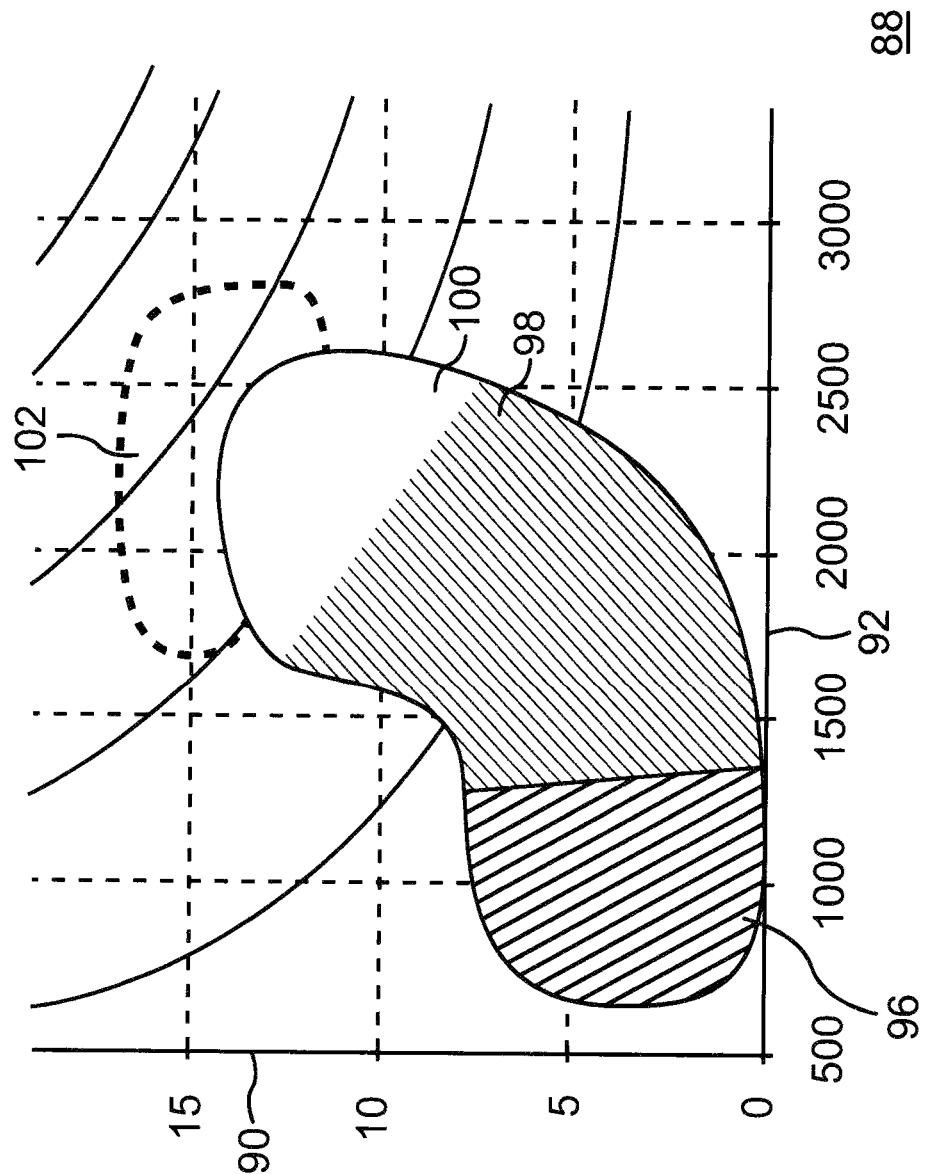
FIG. 2 is a representation of an operating strategy for the internal combustion engine according to FIG. 1, wherein a mean effective pressure of the internal combustion engine is shown over a speed thereof.

FIG. 2 shows an operating strategy of the internal combustion engine 10 according to FIG. 1 in a diagram 88, wherein a mean effective pressure of the internal combustion engine 10 is indicated on the Y axis 90 and a speed of the internal combustion engine 10 on the X axis 92 according to FIG. 2. The mean effective pressure is thereby given in bar as a measurement unit, the speed in 1 per minute as a measurement unit. The values indicated in the diagram 88 are thereby to be understood merely by way of example. A region 96 characterizes an operating region of the internal combustion engine 10, in which an exhaust gas recirculation is carried out through the low pressure exhaust gas recirculation line 80. In regions 98 and 100 a combined exhaust gas recirculation is carried out, whereby this constitutes a combination of exhaust gas recirculation through the low pressure exhaust gas recirculation line 80 and the high pressure exhaust gas recirculation arrangement 74. A cooling of the exhaust gas recirculated through the low pressure exhaust gas recirculation line 80 is thereby necessary in region 100.

In a further region 102, thus in an upper load range of the internal combustion engine 10, an exhaust gas recirculation is carried out through the high pressure exhaust gas recirculation arrangement 74.

With the operating strategy shown in FIG. 2 compliance with EU6 emission limits is possible.

Figure 3:
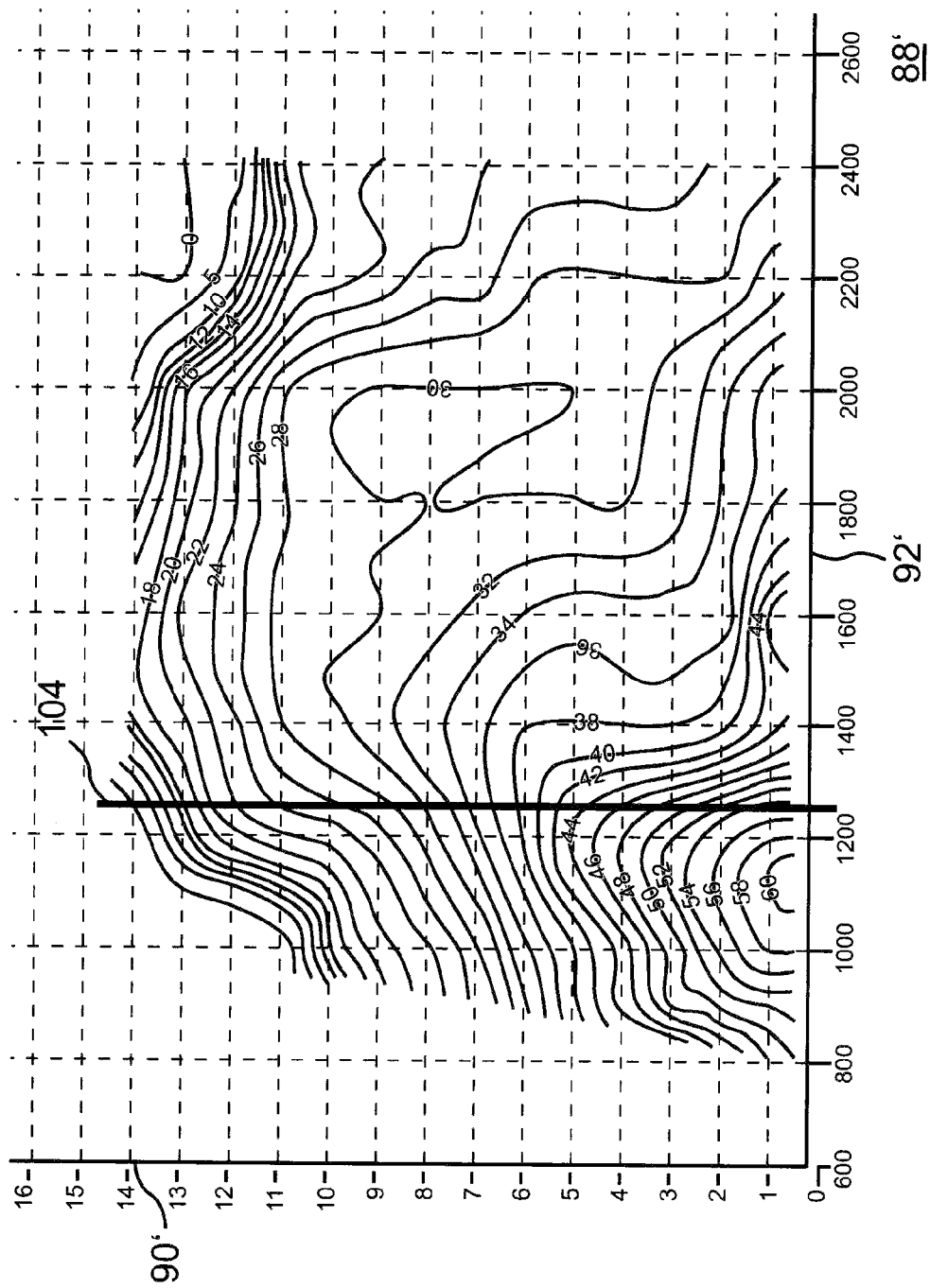
FIG. 3 shows an operating strategy for a low pressure exhaust gas recirculation of the internal combustion engine according to FIG. 1, wherein the mean effective pressure of the internal combustion engine is shown over the engine speed.

FIG. 3 shows an operating strategy of the flow through the low pressure exhaust gas recirculation line 80 according to FIG. 1 in a diagram 88', wherein the mean effective pressure of the internal combustion engine 10 is indicated on the Y axis 90' and the speed on the X axis 92' in the respective measurement units mentioned in connection with FIG. 2. The isolines shown in the diagram 88' and provided with numbers describe a low pressure exhaust gas recirculation rate, whereby in a speed range below a switching threshold 104 an exhaust gas recirculation is carried out through the low pressure exhaust gas recirculation line 80 and above the switching threshold 104 an exhaust gas recirculation is carried out through a combined exhaust gas recirculation operation, as already explained in connection with diagram 88 of FIG. 2.

Figure 4:
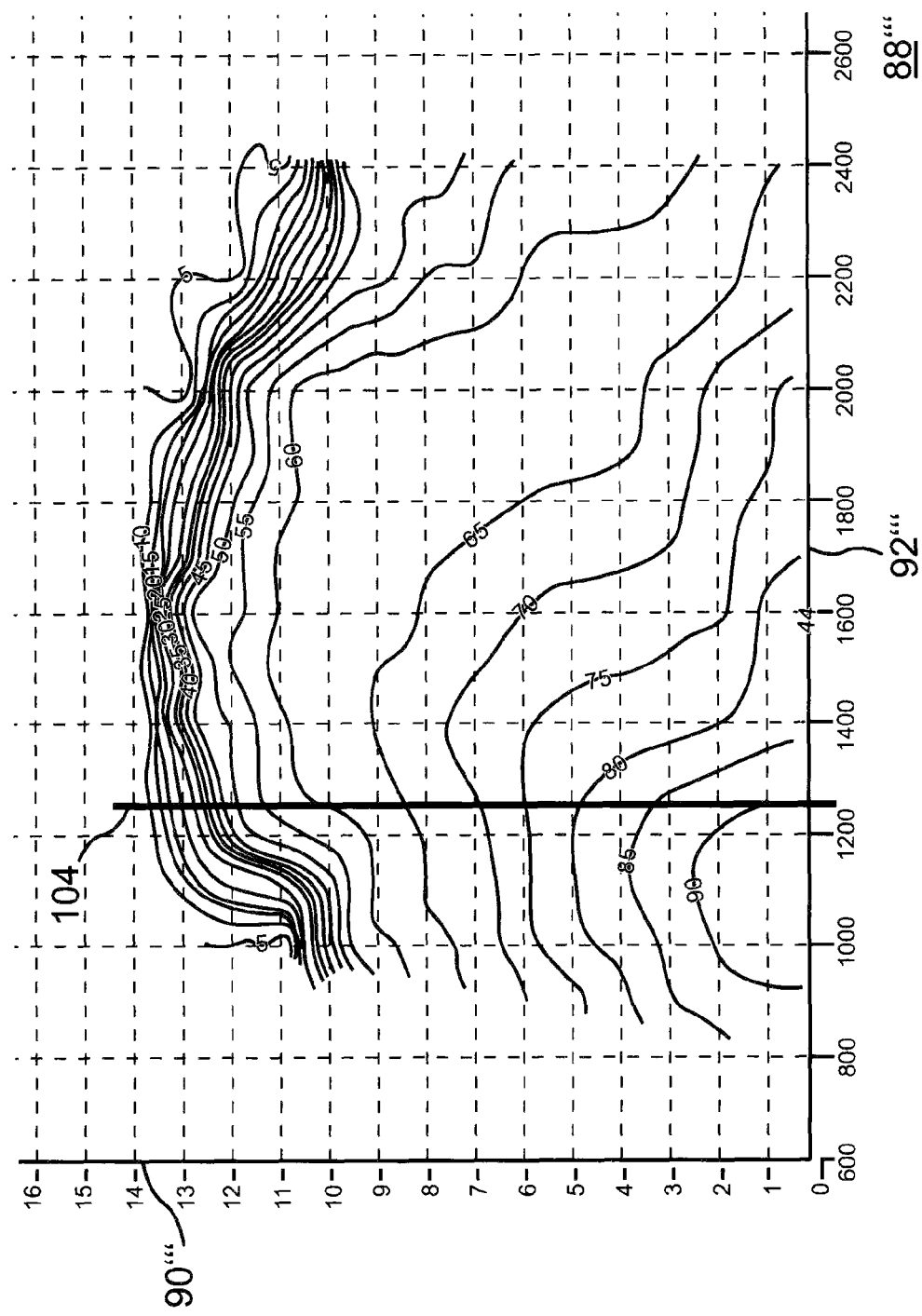
FIG. 4 shows an operating strategy of a low pressure exhaust gas recirculation build-up valve of the internal combustion engine according to FIG. 1, wherein the mean effective pressure of the internal combustion engine is shown over the engine speed

FIG. 4 also shows in a diagram 88''' an operating strategy and indeed the operating strategy of the exhaust gas build-up valve 86 in the low pressure exhaust gas recirculation line 80, whereby the isolines shown in the diagram 88''' indicate a duty cycle of the exhaust gas build-up valve 86 in a percentage as a measurement unit. A duty cycle of 0% thereby corresponds to an open position of the exhaust gas build-up valve 86 while a duty cycle of 100% corresponds to a closed position of the exhaust gas build-up valve 86. An A Y axis 90''' of the diagram 88''' indicates in turn values for the mean effective pressure of the internal combustion engine 10 in bar, while the speed of the internal combustion engine 10' is indicated on the X axis 92''' in the measurement unit of 1 per minute. With regard to the switching threshold 104 indicated in the diagram 88''' the indications given in the context of the previous diagrams 88' and 88'' apply accordingly.

Figure 5:
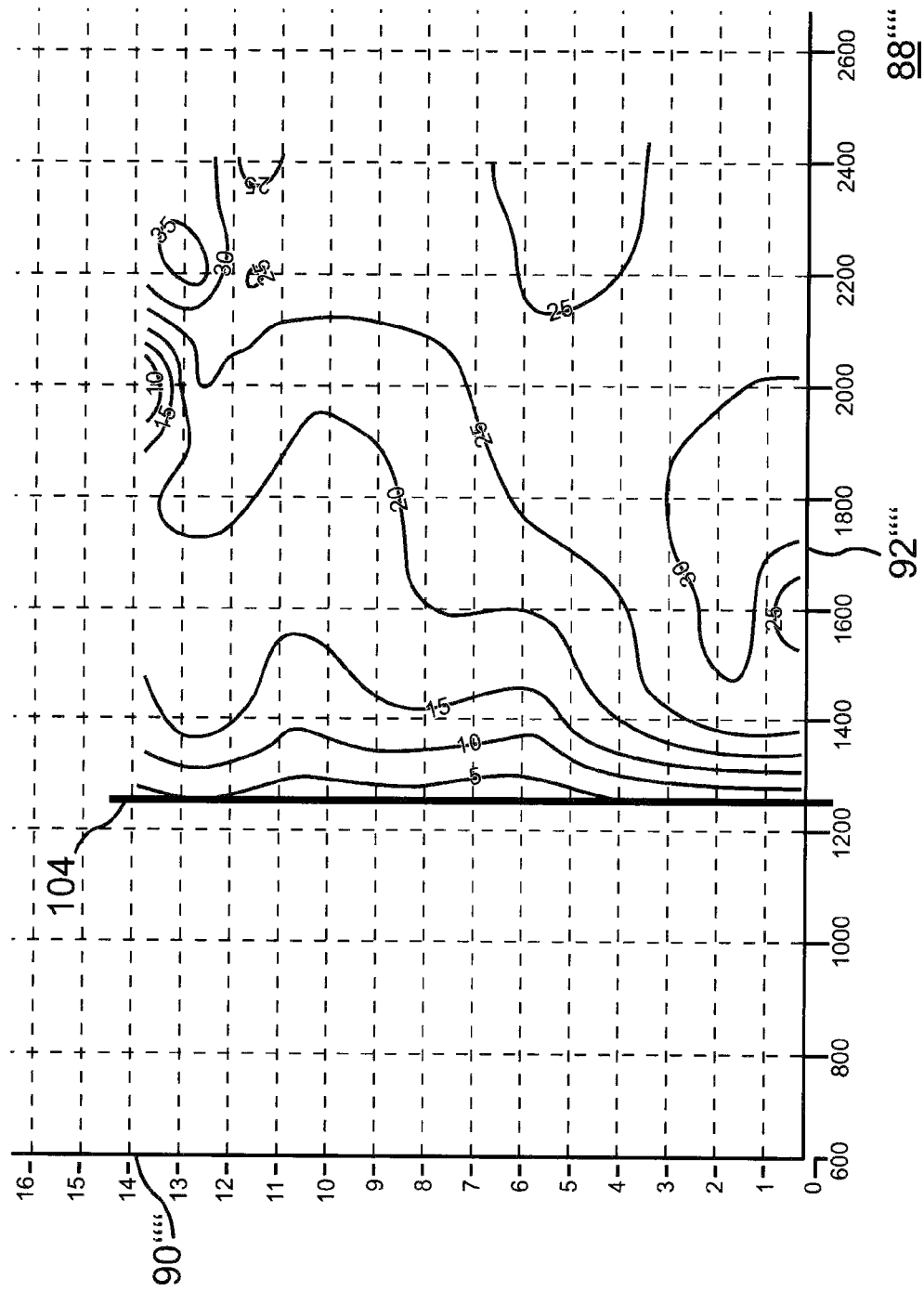
FIG. 5 shows an operating strategy for a high pressure exhaust gas recirculation valve of the internal combustion engine according to FIG. 1, wherein the mean effective pressure of the internal combustion engine is shown over the engine speed.

FIG. 5 shows in a diagram 88'''' an operating strategy of the high pressure exhaust gas recirculation valve 76 of the high pressure exhaust gas recirculation line 74, whereby the mean effective pressure of the internal combustion engine 10 in bar as the measurement unit, is indicated on the Y axis 90'''' and the speed of the internal combustion engine in rpm as the measurement unit, is indicated on the X axis 92''''. The isolines shown in the diagram 88'''' describe a duty cycle of the high pressure exhaust gas recirculation valve 76 as a percentage. In this case a duty cycle of 0% corresponds to a closed position of the high pressure exhaust gas recirculation valve 76, while a duty cycle of 100% corresponds to an open position thereof. As can be deduced from the diagram 88'''' and can be recognized in comparison with diagram 88''', the high pressure exhaust gas recirculation valve has intermediate positions between a completely closed and a completely open position. In contrast, the low pressure exhaust gas recirculation valve 82 is either completely closed or completely open. It is, however, also possible to provide intermediate positions of the low pressure exhaust gas recirculation valve 82.

It is further clear from FIG. 5 that the high pressure exhaust gas recirculation valve 76 is activated merely in the speed range above the switching threshold 104, as it is in this range—as already mentioned—that a combination of an exhaust gas recirculation by means of the high pressure exhaust gas recirculation arrangement 74 and by means of the low pressure exhaust gas recirculation line 80 is carried out, while below the switching threshold 104 merely an exhaust gas recirculation through the low pressure exhaust gas circulation line 80 is carried out. In this lower speed range an activation of the high pressure exhaust gas recirculation valve 76 is not therefore necessary and is not provided.

It should be noted at this point that in particular the values of the isolines of the diagrams 88, 88', 88''', 88'''' are to be regarded as an example and can by all means fluctuate within certain boundaries. The same applies to the mean effective pressure and the speed of the internal combustion engine 10.

LIST OF REFERENCE NUMERALS

10 Internal combustion engine
12 Cylinder
14 Cylinder
16 Cylinder
18 Cylinder
20 High pressure injection system
22 High pressure exhaust gas turbocharger
24 Low pressure exhaust gas turbocharger
26 Direction arrow
28 Direction arrow
29 Direction arrow
30 Direction arrow
32 Direction arrow
34 Intake side
36 Compressor
37 Direction arrow
38 Circulation valve
39 Air filter
40 Bypass line
42 Compressor
44 Charging air cooler
46 Bypass line
48 Bypass valve
50 Exhaust gas side
52 Direction arrow
54 Direction arrow
56 Direction arrow
58 Direction arrow
60 Direction arrow
62 Turbine
64 Circulation device
66 Control valve
68 Turbine
70 Bypass line
72 Control valve
73 Exhaust gas purification device
74 Recirculation arrangement
76 Recirculation valve
78 Recirculation cooler
80 Recirculation line
82 Recirculation valve
84 Recirculation cooler
86 Exhaust gas backup valve
88 Diagram
100 Region in diagram
104 Threshold line

What is claimed is:

1. A method for operating an internal combustion engine (10) with at least one high pressure and one low pressure exhaust gas turbocharger (22, 24) and comprising on an exhaust gas side (50) of the internal combustion engine (10) turbines (62, 68) arranged in series in an exhaust gas line of the internal combustion engine (10) including a high pressure exhaust gas recirculation line (74) and a low pressure exhaust gas recirculation line (80), for recirculating exhaust gas to an intake side (34) of the internal combustion engine (10) subject to an operating state of the internal combustion engine (10), with a switching threshold (104) provided in a speed range of the internal combustion engine (10), wherein a switch from a recirculation of the exhaust gas by way of the low pressure exhaust gas recirculation line (80) to a recirculation of the exhaust gas by way of the high pressure exhaust gas recirculation line (74) and by way of the low pressure exhaust gas recirculation line (80) is established, the method comprising the steps of: switching from a recirculation of the exhaust gas by way of the low pressure exhaust gas recirculation line (80) to a recirculation of the exhaust gas by way of the high pressure exhaust gas recirculation line (74) and by way of the low pressure exhaust gas recirculation line (80) upon reaching a switching threshold (104) in a speed range 1000≤rpm≤2000; recirculating the exhaust gas in a speed range of the internal combustion engine (10) below the switching threshold (104) exclusively by way of the low pressure exhaust gas recirculation line (80); in a speed range of the internal combustion engine (10) above the switching threshold (104), recirculating the exhaust gas in a combined manner by way of the high pressure exhaust gas recirculation line (74) and by way of the low pressure exhaust gas recirculation line (80); and in an upper speed range or load range of the internal combustion engine (10) recirculating the exhaust gas exclusively by way of the high pressure exhaust gas recirculation line (74).

2. The method according to claim 1, wherein the switching threshold (104) is at 1250 rpm at which point, with increasing speed, there is a switch from a recirculation of the exhaust gas by way of the low pressure exhaust gas recirculation (80) to a recirculation of the exhaust gas by way of the high pressure exhaust gas recirculation (74) and by way of the low pressure exhaust gas recirculation (80).

3. The method according to claim 2, wherein, in a speed range of the internal combustion engine (10) above the switching threshold (104), the exhaust gas recirculated via the low pressure exhaust gas recirculation line (80) is cooled by an exhaust gas recirculation cooler (84) disposed in the low pressure exhaust gas recirculation line (80).

4. The method according to claim 2, wherein, in a speed range of the internal combustion engine (10) below the switching threshold (104), exhaust gas exhaust gas is recirculated at a rate in a range of from 0% to 60%.

5. The method according to claim 2, wherein, in a speed range of the internal combustion engine (10) above the switching threshold (104), exhaust gas is recirculated at a rate in a range of from 0% to 60%.

6. The method according to claim 1, wherein a low pressure exhaust gas recirculation valve (82) provided in the low pressure exhaust gas recirculation (80) is switched between a completely open position when the exhaust gas is recirculated at lower engine speed and when the exhaust gas is recirculated in a combined manner and a completely closed position, when the exhaust gas is recirculated exclusively by way of the high pressure exhaust gas recirculation line (74).

7. The method according to claim 1, wherein the switching by way of the control device occurs in a speed range 1200≤rpm≤1600 of the internal combustion engine (10) for shifting exhaust gas recirculation from a recirculation by way of the low pressure exhaust gas recirculation line (80) to a recirculation of the exhaust gas by way of the high pressure exhaust gas recirculation arrangement (74) and by way of the low pressure exhaust gas recirculation line (80).

8. The method according to 1, wherein the switching by the control device occurs at a speed of the internal combustion engine (10) of about 1250 rpm for shifting exhaust recirculation from a recirculation of the exhaust gas by way of the low pressure exhaust gas recirculation line (80) to a recirculation of the exhaust gas by way of the high pressure exhaust gas recirculation arrangement (74) and by way of the low pressure exhaust gas recirculation line (80).

9. The method according to claim 1, wherein the exhaust gas discharged from the low-pressure turbine is cleaned in an exhaust gas purification device (73) arranged downstream of the turbine (68) of the low pressure exhaust gas turbocharger (24).

10. The method according to claim 1, wherein the lower pressure exhaust gas recirculated to the engine is withdrawn at a point downstream of the exhaust gas purification device (73).

11. The method according to claim 1, wherein the high pressure exhaust gas is withdrawn from the high pressure exhaust gas recirculation arrangement (74) and conducted directly to the intake side (34) of the internal combustion engine (10).

12. The internal combustion engine (10) according to claim 10, wherein the low pressure exhaust as withdrawn from the exhaust duct at a point downstream of the exhaust gas purification device (73) is recirculated to the intake side (34) of a compressor (36) of the low pressure exhaust gas turbocharger (24).

\* \* \* \* \*